United States Patent [19]

Otto

[11] Patent Number: 4,808,012
[45] Date of Patent: Feb. 28, 1989

[54] FLAP SEAL FOR ANTI-FRICTION BEARINGS

[75] Inventor: Dennis L. Otto, Malvern, Ohio
[73] Assignee: The Timken Company, Canton, Ohio
[21] Appl. No.: 29,154
[22] Filed: Mar. 23, 1987
[51] Int. Cl.⁴ .................. F16C 33/78; F16J 15/32; F16J 15/34; F16J 15/44
[52] U.S. Cl. .................... 384/482; 277/68; 277/95; 277/134; 277/152; 384/484
[58] Field of Search ............ 277/68, 133, 134, 95, 277/53, 25; 384/135, 140, 147, 477, 478, 480, 481, 482, 484, 488, 130, 131, 479

[56] References Cited

U.S. PATENT DOCUMENTS

| | | | |
|---|---|---|---|
| 2,188,857 | 1/1940 | Chievitz | 277/134 X |
| 2,353,988 | 7/1944 | Batesole et al. | 384/478 X |
| 2,505,391 | 4/1950 | Fletcher, Jr. | 277/133 X |
| 2,856,208 | 10/1958 | Cobb | 277/133 X |
| 3,515,395 | 6/1970 | Weinand | 277/134 |
| 3,606,353 | 9/1971 | Heinl | 277/134 |
| 3,709,572 | 1/1973 | Pethis | 384/482 |
| 3,729,204 | 4/1973 | Augustin | 277/134 |
| 3,784,268 | 1/1974 | DeGioia et al. | 277/25 X |
| 3,790,178 | 2/1974 | Cameron | 277/95 |
| 3,934,888 | 1/1976 | Lutz | 277/134 |
| 4,094,518 | 6/1978 | Cox | 277/95 |
| 4,399,998 | 8/1983 | Otto | 277/134 |
| 4,522,411 | 6/1985 | Burgan | 277/134 |
| 4,533,265 | 8/1985 | Woodbridge | 384/477 |
| 4,556,225 | 12/1985 | Drygalski et al. | 277/152 |
| 4,557,612 | 12/1985 | Neal | 277/134 X |

FOREIGN PATENT DOCUMENTS

2930462  1/1981  Fed. Rep. of Germany ...... 384/147

Primary Examiner—Allan N. Shoap
Attorney, Agent, or Firm—Gravely, Lieder & Woodruff

[57] ABSTRACT

A flap seal assembly for anti-friction bearings wherein the seal components function to retain the lubricant against leakage to the outside and to function to prevent contaminants entering the bearing from the outside. The seal assembly may have a single set of flaps in combination with a dust lip type seal in one form and it may have a double set of flaps in another form. The seal assembly reduces torque drag on the bearing in the dust lip type seal and is torque free in the double flap seal form.

7 Claims, 2 Drawing Sheets

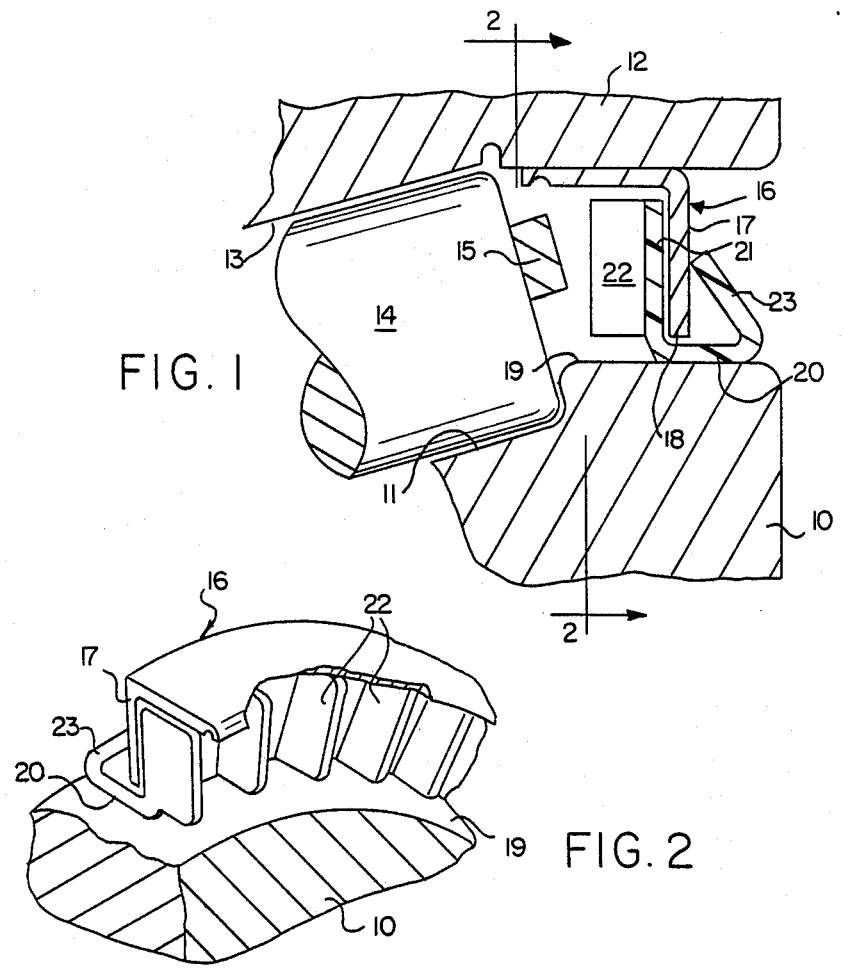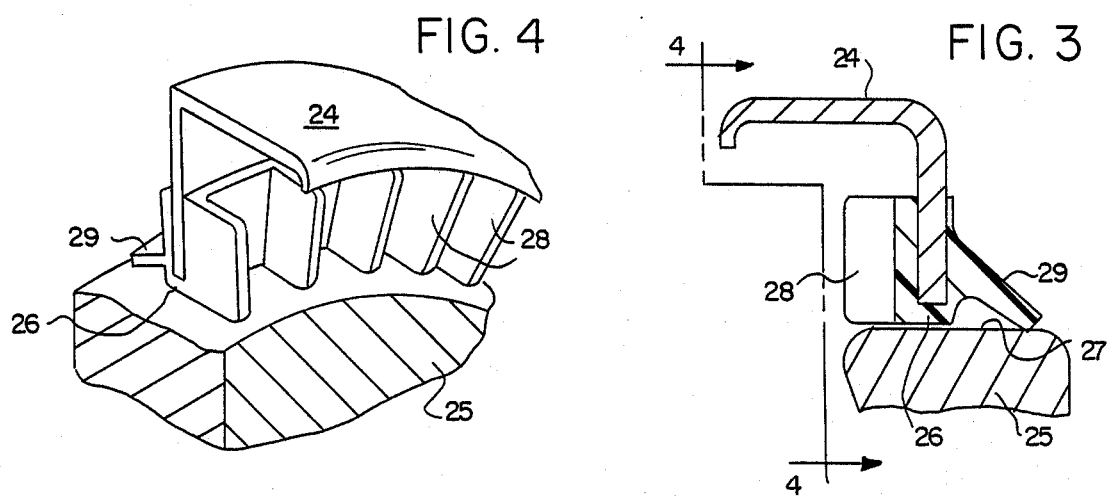

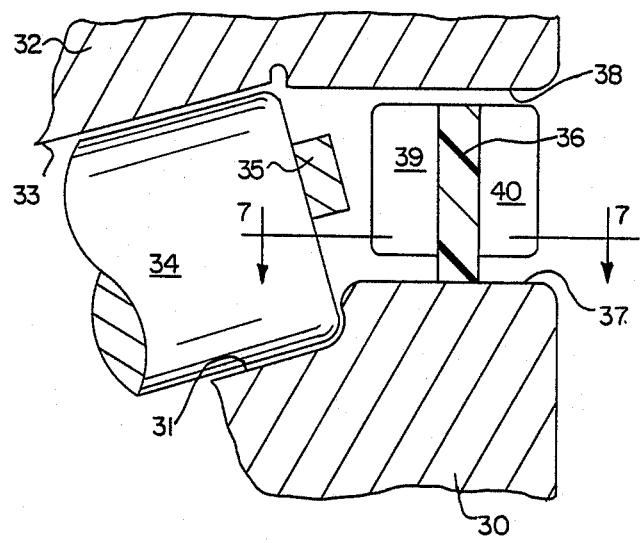
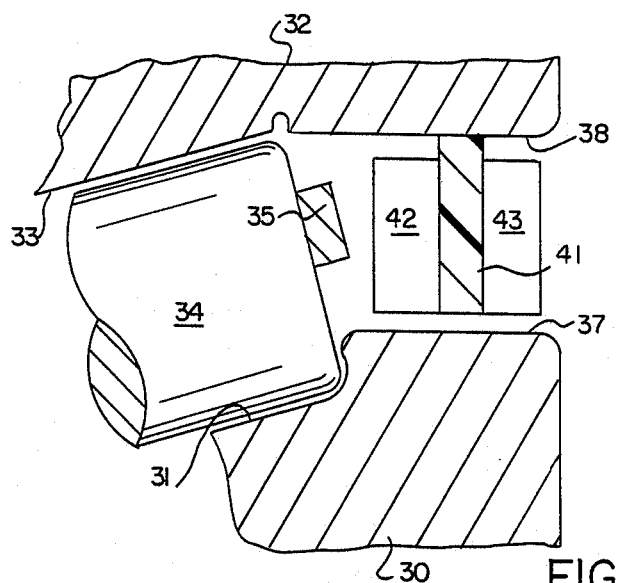
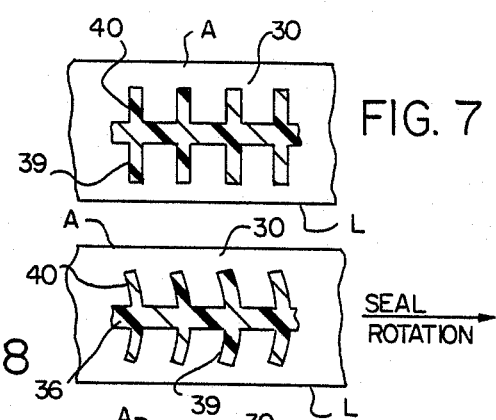
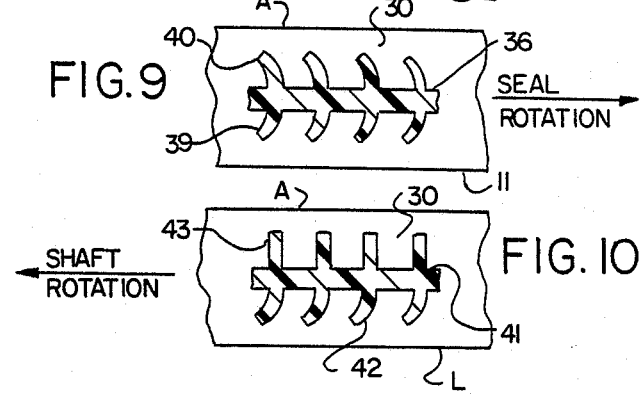

FLAP SEAL FOR ANTI-FRICTION BEARINGS

BACKGROUND OF THE INVENTION

1. Field of the Invention

The present invention is directed to means for protecting anti-friction bearings by means of flap seals which exclude contaminants from the outside while retaining lubricants within the bearing.

2. Description of the Prior Art

The prior art is represented by oil or grease retaining seal means which, during operation, functions to prevent the ingress of water and dirt and external contaminants while substantially preventing leakage of oil or grease to the exterior. An early form of seal is seen in Chievitz U.S. Pat. No. 2,188,857 of Jan. 30, 1940. Subsequent to Chievitz, there is found in the prior art the unidirectional pumping seal disclosed in Weinand U.S. Pat. No. 3,515,395 of June 2, 1970 and Heinl U.S. Pat. No. 3,606,353 of Sept. 20, 1971.

Other forms of sealing means are found in such prior art patents as Cameron U.S. Pat. No. 3,790,178 of Feb. 5, 1974, Otto U.S. Pat. No. 4,399,998 of Aug. 23, 1983, Burgan U.S. Pat. No. 4,522,411 of June 11, 1985 and Drygalski et al U.S. Pat. No. 4,556,225 of Dec. 3, 1985.

The problems encountered with the foregoing prior art reside in the construction which requires the sealing elements for an anti-friction bearing to a actually contact the relatively moving surfaces which results in increasing the torque and generating heat on either the rotating shaft or the bearing housing which supports the seal. These are problems that result in shortened life of the seals amd are not usually detected until lubricant leakage is seen, and that means rapid wear of the bearing assembly has taken place due to the ingress of contaminants from the exterior. Up to this point in time, bearing seals are known to be extremely satisfactory if there is little or no torque resistance and substantial elimination of heat generation. It is known that without the use of an external dust seal lip for anti-friction bearings, substantial torque free performance can be obtained, but there is no satisfactory disclosure available after due consideration of the available prior art assemblies.

BRIEF DESCRIPTION OF THE INVENTION

It is a principal purpose of the present invention to provide an anti-friction bearing seal which is substantially free of contact with the relatively moving surfaces and functions to exclude contaminants from entering the bearing assembly, while functioning to block the leakage of lubricant to the outside of the bearing assembly.

The present anti-friction bearing seal uniquely presents the bearing assembly with flexible sealing means of extruded or molded elastomeric material particularly useful in minimizing the cost of tooling seals for low volume industrial bearing applications. Accordingly, it is an object of the present invention to provide low volume bearing applications with sealing means that substantially exclude contaminants while retaining lubricants for most industrial applications of such bearings.

It is a further object of the present invention to provide a flap seal for anti-friction bearings in which the extrusion or molding of the seal from elastomeric material will have two faces instead of the usual single face so as to provide improved lubricant retention while excluding contaminants.

The flap seal of the present invention has an almost unlimited application for anti-friction bearings regardless of size, shape or configuration, and in which the seal can be adapted to be mounted on either the rotating or the stationary member of the anti-friction bearing.

An additional object of the present invention is to provide a flap seal of the character above referred to which is capable of developing a pumping mechanism through the deflection of the flaps, whereby an inner set of pumping vanes will be effective to retain the lubricant in the bearing assembly while excluding contaminants from the exterior, such pumping mechanisms having increased efficiency as the bearing speed increases.

BRIEF DESCRIPTION OF THE DRAWINGS

The present anti-friction bearing flap seal structure is disclosed in preferred forms in the accompanying drawings, in which:

FIG. 1 is a fragmentary sectional view of so much of an anti-friction bearing assembly as will furnish the environmental setting for the flap seal assembly;

FIG. 2 is a fragmentary perspective view of the flap seal assembly seen along the line 2—2 in FIG. 1;

FIG. 3 is a fragmentary sectional view of a bearing seal case provided with a single flap seal and dust lip in association with a rotating cone or rotating cup member of an anti-friction bearing;

FIG. 4 is a fragmentarly perspective view of the disclosure seen along line 4—4 in FIG. 3;

FIG. 5 is a fragmentary sectional view of a modified anti-friction bearing assembly having a double flap seal for rotating cone applications;

FIG. 6 is a view similar to FIG. 5 showing a double flap seal for rotating cup applications;

FIG. 7 is a schematic plan view of a double flap seal for either rotating cone or cup applications;

FIG. 8 is a view similar to FIG. 7 in which the seal rotates;

FIG. 9 is a view similar to FIG. 7 in which the seal rotates at higher speed than depicted in FIG. 8; and FIG. 10 is a view similar to FIG. 6, illustrating the selective pumping action of a double flap seal on shaft rotation as in FIG. 6 or for cup rotation as in FIG. 5.

DETAILED DESCRIPTION OF THE EMBODIMENTS

The preferred embodiment of the present invention is an anti-friction bearing assembly wherein a flexible flap is operatively mounted in a position for opposing the outward movement or leakage of lubricant from the bearing assembly and a cooperating device in position to oppose the movement of outside contaminants into the bearing assembly. That sort of embodiment may be attained in several ways.

FIGS. 1 and 2 are illustrations of an anti-friction bearing having an inner cone 10 with a raceway 11, an outer cup 12 with a cooperating raceway 13, and a desired complement of bearing rollers such as tapered type roller 14 (one being shown) maintained in running positions between the raceways 11 and 13 by cage means 15. The space between the cone 10 and cup 12 is occupied by a seal case 16 that is frictionally engaged on a surface of the cup 12 and is formed with a wall 17 extending toward but free of contact by its end 18 with a surface 19 on the cone. A seal body 20 is frictionally mounted on the surface 19 of the cone to move with movement of the cone relative to the cup, depending on which component is intended to rotate.

The seal body 20 is formed with a flange 21 that projects upwardly in the seal case along side by not contacting the wall 17, and that flange 21 is formed with a plurality of flexible flaps 22 which project inwardly toward the roller 14. The seal body 20 is formed also with a dust lip 23 that has an edge contact on the seal case 17 opposite the flaps 22. The arrangement is such that the flaps 22 are directed axially of the rotating cone and are on the grease or lubricant side of the seal case 17. The outside of the wall 17 cooperates with the dust lip 23 to exclude the ingress of contaminants. During rotation of the body 20 the flaps assume a deflected position so that curved surfaces act as a pumping mechanism to prevent the grease or lubricant escaping from the bearing assembly. This flap grease retaining mechanism in conjunction with the dust lip type seal operates as a bearing seal for bearing applications where grease is used and the rotary speed is sufficient to retain the grease.

A modified seal arrangement is disclosed in FIGS. 3 and 4. The bearing assembly environment for FIGS. 3 and 4 is similar to that disclosed in FIGS. 1 and 2, but has been abbreviated so only the seal case 24 is shown in relation to the bearing cone 25. In this arrangement an elastomeric body 26 is molded onto the seal case and is spaced from the surface 27 of the cone 25. The body 26 is formed with a flange 26A on which are carried flexible flaps 28 at the inner side of the seal case, and the body 26 is formed with a dust lip 29 at the outer side of the seal case. The dust lip 29 has an edge contact on the cone 25 to present a very minimum of contact.

The seal arrangements seen in FIGS. 1 to 4 have similar sealing functions: that is to say the flexible flaps 22 or 28 are axially directed on the grease side of the seal case, and are substantially equally spaced around the circumference of the bearing cone 10 or 25 to react on rotation for retaining the grease, while the dust lips 23 or 29 function to exclude contaminants. These arrangements have low or reduced torque drag and heat generation due to the line contact of the dust lips for either shaft or seal case rotation. The sealing performance increases with operating speed increase. The flexibility of the flaps 22 or 28 allows them to function by being deflected during rotation to present a curved surface to the grease so they act as a pumping mechanism which imposes a minimum of drag and heat generation.

The assembly of FIG. 5 includes a cone body 30 having a raceway 31, a cup body 32 having a raceway 33, roller bearing means 34 retained in operating position by cage means 35. The space between the cone 30 and cup 33 is occupied by a double flap seal assembly that does not require a seal case. The seal assembly seen in FIG. 5 is an extruded or molded elastomeric body 36 that is frictionally engaged on the circumferential surface 37 of the cone 30 and spaced from the surface 38 on the cup 32 by a desired clearnace or gap. That gap has been exaggerated in FIG. 5. The body 36 is formed with an inner plurality of spaced flexible flaps 39 axially directed relative the cone 30, and an outer flurality of flexible flaps 40. The flaps are intended to flex into positions presenting curved surfaces, the surfaces on flaps 39 deflecting the grease back into the bearing and the flaps 40 deflecting contaminants away from the bearing.

The assembly seen in FIG. 6 is a modification double flap design similar to that of FIG. 5. Similar parts are designated by similar reference numerals. The difference resides in the molded or extruded elastomeric body 41 being arranged to frictionally engage on the cup surface 38 and have a clearance or gap at the cone surface 37. The inner flexible flaps 42 and the outer flexible flaps 43 on the body 41 function in like manner to the flaps on the body 36 in FIG. 5.

The double flap arrangement seen in FIGS. 5 and 6 has been depicted in certain functional settings in teh sequence of views seen in FIGS. 7 to 10 inclusive. The seal body 36 or 41 may be mounted on either a rotating or a stationary component of the bearing assembly. The seal flaps function by creating a surface which deflects whatever substances are encountered. For Example, in FIG. 7, the plan view is the seal body 36 from FIG. 5 on a shaft cone 30 with no relative rotation. There is indicated in that view an "air side" A and a "lubricant side" L. Those notations A and L will be applied to each of the plan views.

The view of FIG. 8 represents the response of the seal 36 when it rotates at low speed. In this response the curved surfaces of the flaps 39 and 40 deflect contaminants away from the seal at the side A, and the lubricant at the side L is deflected back into the bearing.

The view of FIG. 9 is similar to FIG. 8 but illustrates the function of the flaps 39 and 40 at higher speed than for the flaps in FIG. 8. This indicates that the capacity of the flaps to deflect is greatly increased with speed increase when the seal 36 is the moving component.

FIG. 10 illustrates a condition when the double flap seal 41 is carried on a stationary bearing component. Since grease in the bearing will move against the flaps 42 on the "L" side, those flaps will deflect the grease, but the flaps 43 on the air side A will not deflect at all.

What has been disclosed in the sequence of views of FIGS. 7-10 is that the double flap type seal body provides a pumping or deflecting mechanism. As the flaps deflect on encountering air, oil, grease, water or dirt resistance they act like a vane on a pump which assumes a position to deflect the medium that offers a resistance away from the seal. It is desirable to have the pumping or deflecting efficiency improve with seal speed increase. The amount of flap deflection can be controlled by the axial length and thickness of the flaps, as well as by having the flaps taper to a thinner section at the tips than at the roots. Moreover, the flaps on one side of the seal body may be different so the function of the total seal can be optimized for the lubricant side and also optimized for the air side to respond to the expected character of contaminants to be encountered. Thus, more flexibility may be designed for the air side than the lubricant side.

The foregoing disclosure has set forth a unique seal assembly for anti-friction or other types of bearings wherein the components of the seal function to retain lubricant in the bearing and exclude contaminants. The seal assembly may have a single set of flexible flaps in combination with a dust tip type seal, or it may have a double flap type seal body, all as described above. The seal has the ability to reduce torque drag on the assembly and avoids heat generation by being able to avoid rubbing contact on a rotating shaft or rotating housing. The double flap seal is torque free as there is no contact, but just close running tolerances, and the flaps are attached to the support body so as to have three edges free whereby the flaps are able to flex (or bend) from the attachment in uniform manner.

What is claimed is:

1. A lubricant retention and seal device for a lubricant containing anti-friction bearing assembly having relatively rotatable spaced apart inner and outer bearing members and rolling elements in the space between the bearing members, said seal device comprising:
   (a) a body carried on one of said bearing members in position to be free of contact with the other one of said bearing members so that said body rotates with said one bearing member, said body having a first side presented to the space between the inner and outer bearing members adjacent said rolling elements and a second side presented to the exterior of that space;
   (b) a plurality of flexible flap elements supported by said body in circumferentially spaced apart positions, said flap elements being directed into the space between said inner and outer bearing members, and said flexible flap elements having a contact with said body along one margin and having all other margins projecting into said space and being free of contact with said inner and outer bearing members and said body so that upon relative rotation of said inner and outer bearing members said flexible flaps contact the lubricant and deflect into positions as a result of that contact with the lubricant to form surfaces which act as a pumping mechanism to retain the lubricant in the bearing assembly.

2. The seal device set forth in claim 1 wherein said body is carried on the inner one of the inner and outer bearing members and is formed with means carried on said exterior side thereof in position to exclude contaminants from entering the retained lubricant.

3. The seal device set forth in claim 1 wherein said body is formed with a dust lip thereon positioned on the side presented to the exterior of the space between the inner and outer bearing members, said dust lip having an edge in line contact with said other one of said bearing members.

4. The seal device set forth in claim 1 wherein said flexible flaps on contact with the lubricant deflect into positions proportional to the quantity of lubricant to be retained.

5. The seal device set forth in claim 1 wherein the amount of said deflection of the flexible flaps is proportional to the relative speed of rotation between said inner and outer bearing members.

6. The seal device set forth in claim 1 wherein said body is carried on the outer one of said inner and outer bearing members and is formed with means carried on said exterior side thereof in position to exclude contaminants from entering the retained lubricant.

7. Teh seal device set forth in claim 1 wherein a second plurality of flexible flap elements are supported by said body in circumferential spaced apart positions, said second plurality of flexible flaps project outwardly of said bearing assembly and deflect on contact with contaminants into positions proportional to the quantity of contaminants to be excluded.

* * * * *

UNITED STATES PATENT AND TRADEMARK OFFICE
CERTIFICATE OF CORRECTION

PATENT NO. : 4,808,012

DATED : February 28, 1989

INVENTOR(S) : Dennis L. Otto

It is certified that error appears in the above-identified patent and that said Letters Patent is hereby corrected as shown below:

Column 1, line 29, after "to" the word "a" should be omitted.

Column 4, line 11, "teh" should be "the".

Column 4, line 61, "tip" should be "lip".

Column 6, line 25, "Teh" should be "The".

Signed and Sealed this

Tenth Day of October, 1989

Attest:

DONALD J. QUIGG

*Attesting Officer*  *Commissioner of Patents and Trademarks*